July 8, 1969   F. W. SCHROEDER   3,453,756
REVERSIBLE EXCAVATING TOOTH
Filed March 13, 1968                          Sheet 1 of 5
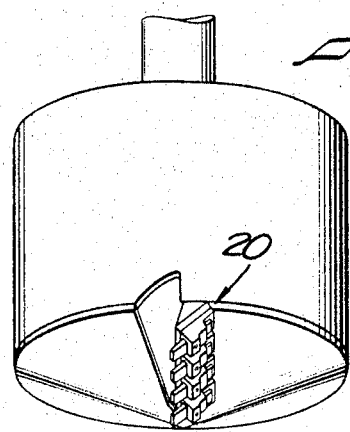
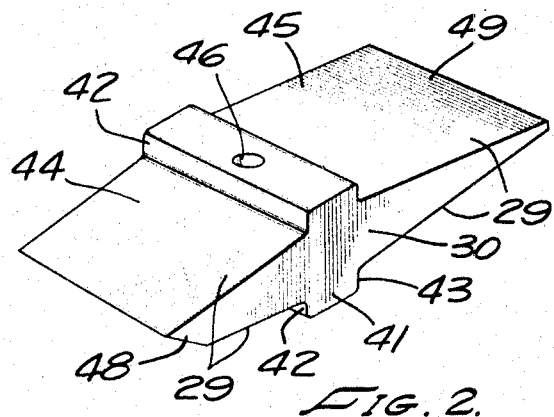
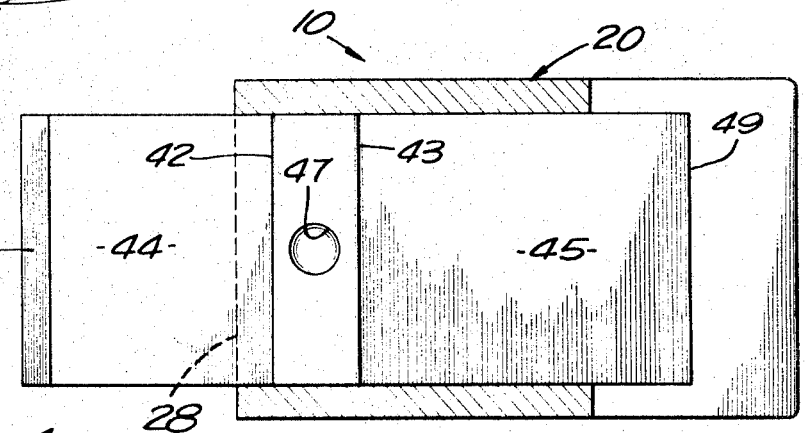
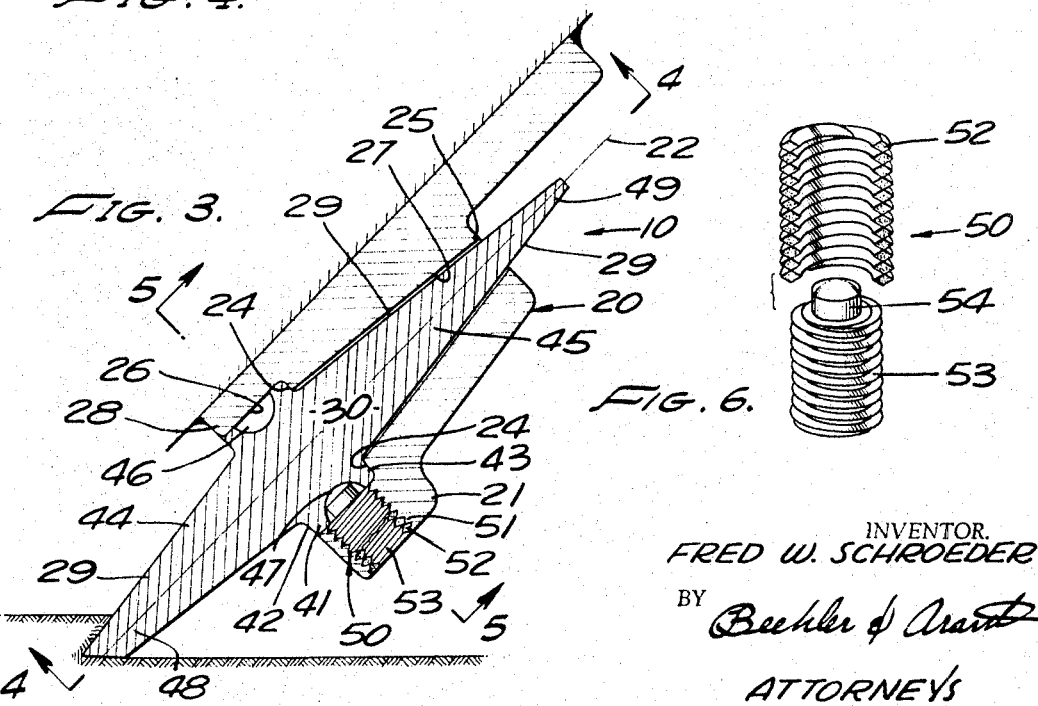
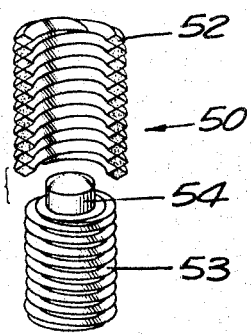
INVENTOR.
FRED W. SCHROEDER
BY Beehler & Arant
ATTORNEYS INVENTOR.
FRED W. SCHROEDER
BY Buehler & Arant
ATTORNEYS

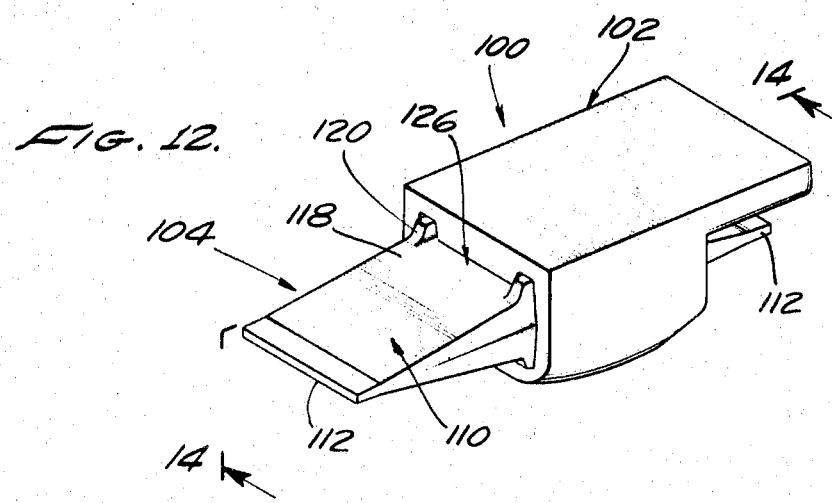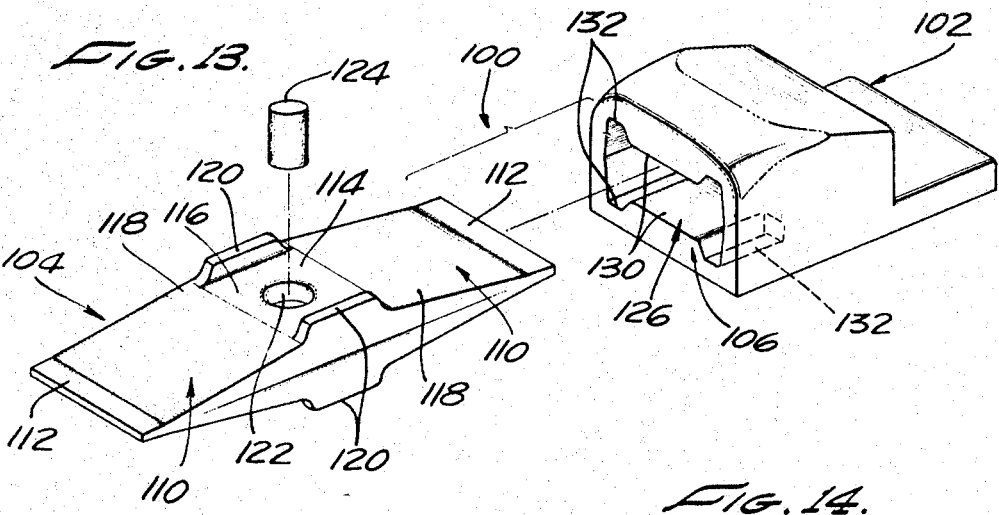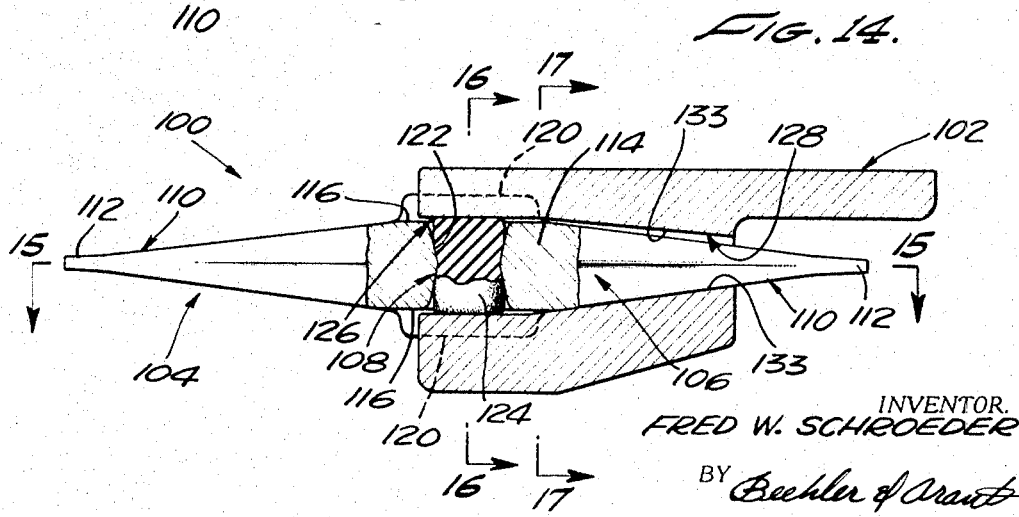

INVENTOR.
FRED W. SCHROEDER
BY Beehler & Arant
ATTORNEYS

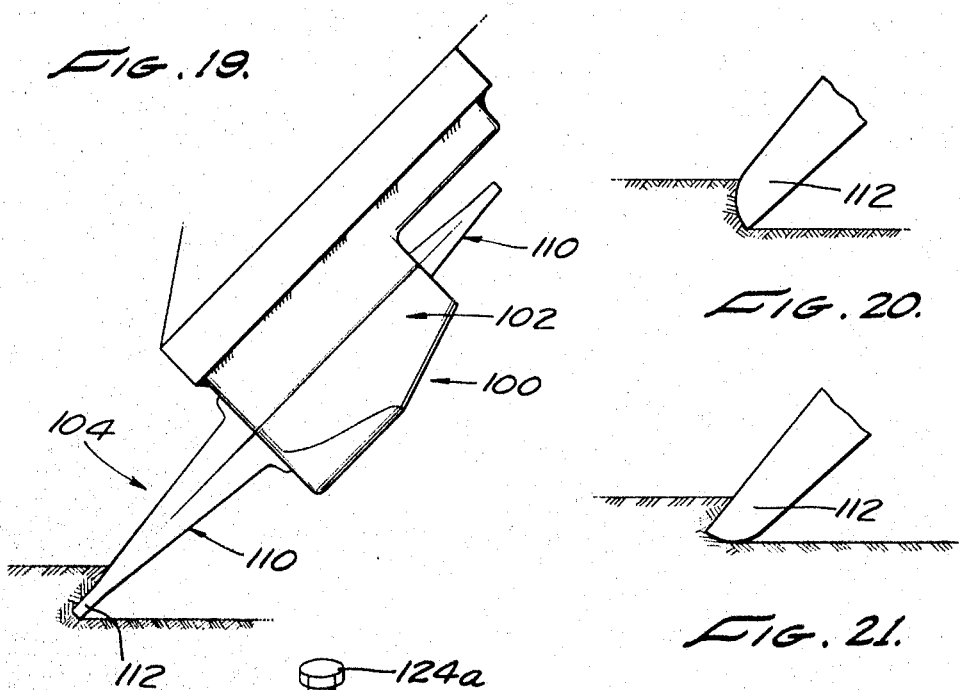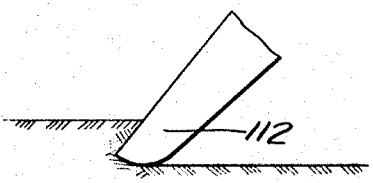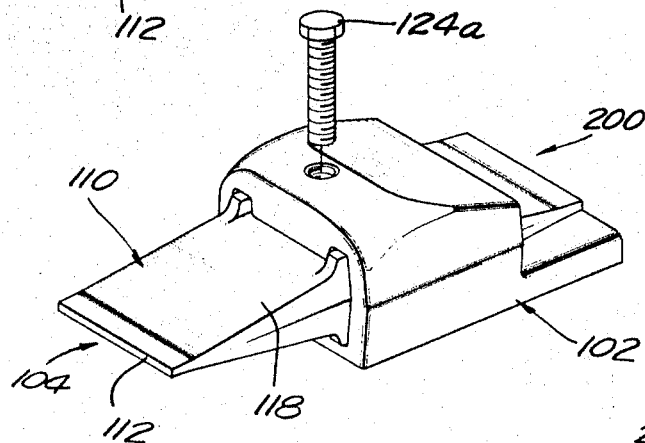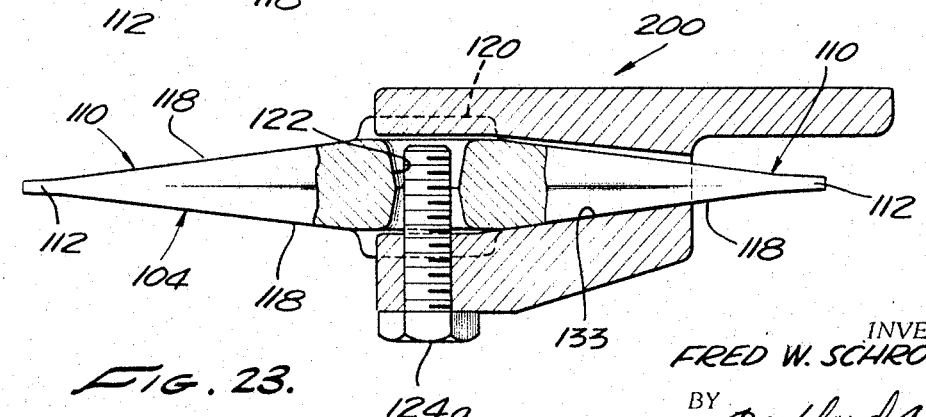

2,483,032. A reversible excavating tooth assembly, on the other hand, has an excavating tooth with two working ends and may be selectively installed in the tool holder with either end exposed for use. Patent No. 2,401,250 discloses such a reversible tooth assembly.

United States Patent Office 3,453,756
Patented July 8, 1969

3,453,756
REVERSIBLE EXCAVATING TOOTH
Fred W. Schroeder, Anaheim, Calif., assignor to Smith Industries International, Inc., Santa Fe Springs, Calif., a corporation of California
Continuation-in-part of application Ser. No. 638,012, May 12, 1967. This application Mar. 13, 1968, Ser. No. 716,693
Int. Cl. E21b 9/02, 9/36; E21c 13/01
U.S. Cl. 37—142
6 Claims

ABSTRACT OF THE DISCLOSURE

A reversible excavating tooth assembly having a tooth holder providing a tooth receiving socket, and a double ended excavating tooth which may be inserted into the socket with either working end of the tooth exposed for use. The working ends of the tooth and the rear portion of the tooth socket have generally complementary tapered and shouldered configurations, such that lateral excavating loads on the tooth are resisted by contacting tapered surfaces on the tooth and holder to achieve effective lateral load transfer from the tooth to the holder and firm retention of the tooth against lateral rocking motion under the loads, while axial excavating loads on the tooth are resisted by contacting longitudinally presented shoulder surfaces on the tooth and holder to prevent wedging of the tooth in the socket. The tooth is also reversibly positionable about its longitudinal axis to effect uniform wear of its working ends.

---

This application is a continuation-in-part of my copending application Ser. No. 638,012 filed May 12, 1967, and entitled, "Reversible Excavating Tooth", now abandoned.

BACKGROUND OF THE INVENTION

Field of the invention

This invention relates generally to excavating equipment and more particularly to a novel reversible excavating tooth assembly.

Prior art

Numerous forms of excavating tooth assemblies have been devised for installation on excavating devices of various types, such as rotary earth boring tools, power driven rippers, excavating and loading buckets, and other similar ground working tools. Such tooth assemblies may be classified as reversible and non-reversible and are characterized in general terms by an excavating tooth proper and a tooth holder. A non-reversible tooth assembly of this type has an excavating tooth with a single working end and an opposite coupling end which is attached to the tooth holder. An exemplary tooth assembly of this type is disclosed in Patent No.

SUMMARY OF THE INVENTION

This invention provides an improved reversible excavating tooth assembly. The present tooth assembly has a holder with a tooth receiving socket and a double ended excavating tooth proper which may be inserted into the socket with either working end of the tooth exposed for use. A primary feature of the assembly resides in the fact that the tooth and socket have generally complementary tapered and shouldered shapes, such that lateral excavating loads on the tooth are resisted by contacting tapered surfaces of the tooth and socket to achieve effective transfer of the lateral loads to the holder and retention of the tooth against lateral rocking motion relative to the holder, while longitudinal excavating loads on the tooth are resisted by contacting longitudinally presented shoulder surfaces on the tooth and holder to prevent wedging of the tooth in the socket. The tooth is reversible end for end to permit either working end of the tooth to be used for excavating. The tooth is also rotatably reversible about its longitudinal axis to effect uniform wearing of each working end. The rear end of the tooth socket is open to expose the socketed end of the tooth and thereby permit forward driving of the tooth from the socket. The tapered configuration of the tooth ends is desirable from the standpoint of equalizing bending stress in the tooth under lateral loading of the tooth in use and optimizing the tooth shape for excavation.

BRIEF DESCRIPTION OF THE DRAWINGS

FIGURE 1 is a perspective view of a rotating digging bucket in which tooth structures according to the present invention have been incorporated;

FIGURE 2 is a perspective view of one form of excavating tooth in accordance with the invention;

FIGURE 3 is a longitudinal cross-sectional view of a complete excavating tooth assembly which incorporates the tooth of FIGURE 2;

FIGURE 4 is a view, partially in cross-section, taken on the line 4—4 of FIGURE 3;

FIGURE 6 is a perspective view of the set screw fastening device used in the tooth assembly of FIGURE 3;

FIGURE 12 is a perspective view of a modified and presently preferred excavating tooth assembly according to the invention;

FIGURE 13 is an exploded perspective view of the modified tooth assembly;

FIGURE 14 is a section taken on line 14—14 in FIGURE 12;

FIGURE 19 is a side elevation of the modified tooth assembly in excavating operation;

FIGURES 20 and 21 are enlarged fragmentary details of the working end of the excavating tooth illustrating the manner in which the tooth may be rotatably reversed about its longitudinal axis to achieve uniform wearing of the tooth;

FIGURE 22 is a perspective view of a further modified excavating tooth assembly according to the invention; and FIGURE 23 is a longitudinal section through the tooth assembly of FIGURE 22.

DESCRIPTION OF THE PREFERRED EMBODIMENTS

Figure 5:
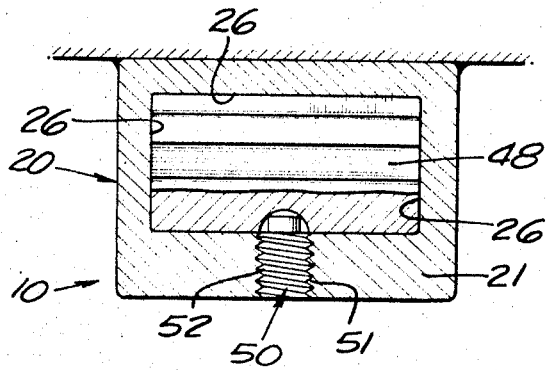
FIGURE 5 is a cross-sectional view taken on the line 5—5 of FIGURE 3.

One embodiment 10 of the invention is shown in FIGURES 2 to 6, inclusive, and will first be described. The complete excavating tooth assembly 10 includes a tooth holder 20 having a tooth socket for receiving an excavating tooth 30 proper. Tooth 30 has an enlarged central portion 41 of substantially rectangular cross-section, a tapered substantially wedge-shaped forward working end 44 and a tapered substantially wedge-shaped rearward working end 45. A digging element 48 is provided on the extremity of tapered end 44, while a digging element 49 is provided on the extremity of tapered end 45. When working end 44 and its digging element 48 are exposed in working position, as shown in FIGURE 3, the enlarged central portion 41 of the tooth body 30 occupies a correspondingly shaped forward portion of the tooth socket, and the tapered rearward end 45 of the tooth body occupies a correspondingly tapered rearward portion of the tooth socket. The tooth is held in place by releasable fastening means 50, shown in FIGURE 6.

More specifically, the forward extremity 28 of the tooth socket is enlarged to define a forwardly opening recess 26, while the tapered rearward extremity of the socket is designated at 27. In the completed tooth assembly, shown in FIGURE 3, the longitudinal axis of tooth 30 coincides with the longitudinal axis of the tooth socket identified by the extension line 22. At the bottom of the forward recess 26, and facing into it, are a pair of thrust shoulders 24. The rear tapered socket portion 27 is thus of lesser breadth in the plane of the shoulders 24 than the recess 26 and extends rearwardly from the shoulders 24 with a rearwardly convergent taper. Socket portion 27 is open at the rear extremity 25, and the adjacent currently socketed end of the tooth 45 projects therethrough.

The enlarged central portion 41 of excavating tooth 30 is of a rectangular configuration in a transverse plane that is perpendicular to the longitudinal axis 22 of the tooth, and its lateral surfaces parallel the axis. The forward recess 26 of the tooth socket is of a similar configuration, having four flat lateral walls which form holding surfaces for the central portion of the tooth. These surfaces are circumferentially disposed about and parallel the longitudinal axis of the tooth socket. When the tooth 30 occupies its position within the tooth socket, as shown in FIGURE 3, the lateral surfaces of the central tooth portion 41 contact the holding surfaces of the tooth socket. On either end of its enlarged central portion 41, the tooth 30 is reduced in breadth to form projecting ledges or thrust shoulders 42, 43 that extend laterally beyond the adjacent extremities of the corresponding tapered tooth ends 44, 45. With digging element 48 in operative position as shown in FIGURE 3 the shoulders 43 confront and abut the shoulders 24 of the tooth socket. When the tooth is reversed end-for-end the shoulders 42 engage the socket shoulders 24. The tapered end 44 of the tooth then occupies the rearward tapered portion 27 of the tooth socket.

A pair of dimples 46, 47 are formed in respective lateral surfaces of the enlarged central portion 41 of the tooth 30. Lower wall 21 of the tooth holder has a threaded opening 51 formed therein, into which is placed a threaded insert 52 receiving a set screw 53. Tightening of the set screw 53 engages its inner end 54 in the dimple 47 on the tooth to lock the tooth against axial separation from the holder.

In order to remove the tooth 30 from the socket, the set screw 53 is first backed off, and then the projecting rear end of the tooth is struck to drive the tooth forwardly from the tooth socket. The tooth may then be reversed end-for-end, or rotated 180° about its longitudinal axis, before being re-inserted into the socket.

In the embodiment of the invention just described, the tapered walls of the substantially wedge-shaped tooth end 44 are identified at 29. The tapered walls of tooth end 45 are of similar configuration and are also identified by the numeral 29. It is important that the angle of taper of the walls 29 on each end of the tooth be approximately the same so that either end of the tooth will fit equally well into the holder 20. The preferred taper angle is in the range of about 7° to 15°; that is, each of the tapered walls has about a 7° to 15° angular relationship with the longitudinal axis 22 of the tooth.

Figure 7A:
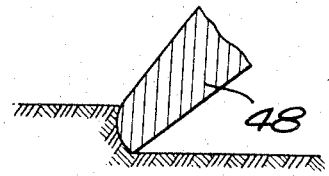
FIGURE 7a is a fragmentary cross-sectional view showing the digging element of FIGURE 3 after it has been worn from usage.
Figure 7B:
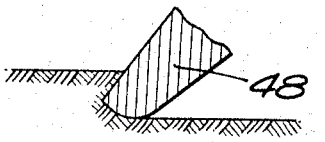
FIGURE 7b is a fragmentary cross-sectional view showing the digging element of FIGURE 7a when reversed in position.

The digging elements 48 and 49 are shown to be integrally formed with the respective tooth ends 44, 45. The digging elements are thus relatively soft and will wear rather readily. When used in a digging operation of the kind shown in FIGURE 3, each digging element is initially formed to a sharp point but will wear into a curved configuration as shown in FIGURE 7a. It is then advantageous to remove the tooth 30 and rotate it 180° about its longitudinal axis before re-inserting it into the holder 20 so that the digging occupies its position shown in FIGURE 7b prior to resumption of digging operations. It will be appreciated that by repeated reversal of its position, the useful life of the digging elements may be extended very considerably, without resharpening.

ALTERNATE TOOTH FORMS

Figure 8:
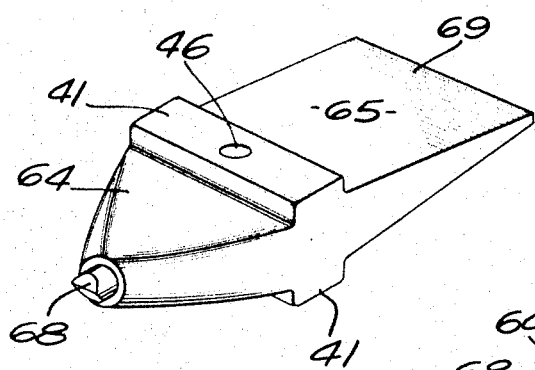
FIGURE 8 is a perspective view of another form of tooth body in accordance with the invention.
Figure 9:
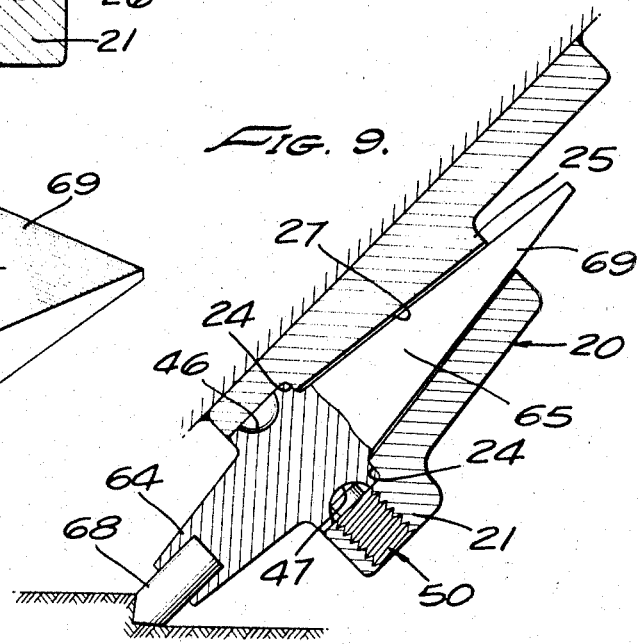
FIGURE 9 is a longitudinal cross-sectional view of an excavating tooth assembly incorporating the tooth body of FIGURE 8.

FIGURES 8 and 9 show one alternate form of the invention. The tooth end 65 and its associated digging element 69 are identical to those shown in FIGURE 2. The tooth end 64, however, rather than being a flat wedge like the tooth end 44 is tapered to a relatively sharp point. Then a hard metal digging element 68 is pressed into a socket in the sharp point of the tooth. Digging element 68 is preferably a tungsten carbide element of conventional composition and construction. It will thus be seen that the embodiment of FIGURES 8 and 9 provides the advantage of two completely dissimilar types of digging elements on the same tooth structure. When hard material is encountered the digging element 68 may be used, and in relatively soft material the tooth is reversed and digging element 69 is used.

Figure 10:
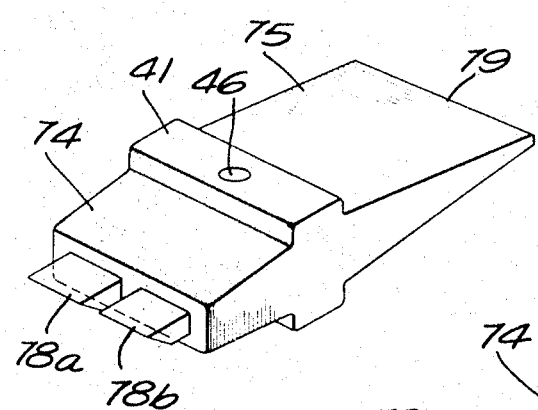
FIGURE 10 is a perspective view of still another form of tooth in accordance with the present invention.
Figure 11:
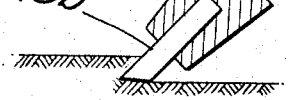
FIGURE 11 is a fragmentary cross-sectional view of the forward end of the tooth of FIGURE 10.
Figure 15:
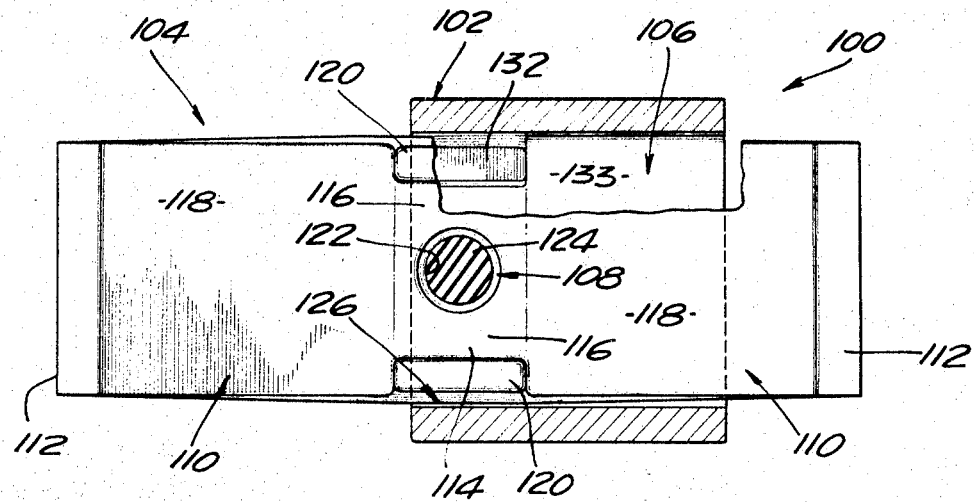
FIGURE 15 is a section taken on line 15—15 in FIGURE 14.
Figure 16:
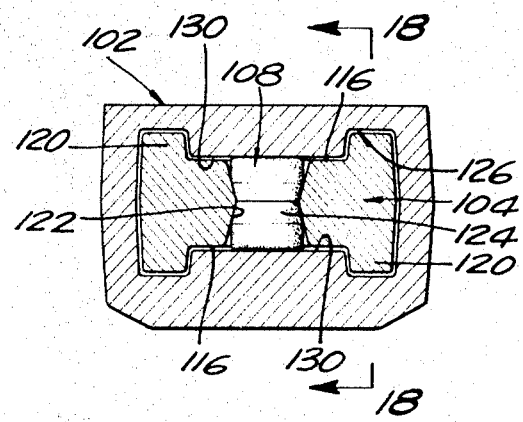
FIGURE 16 is a section taken on line 16—16 in FIGURE 14.
Figure 17:
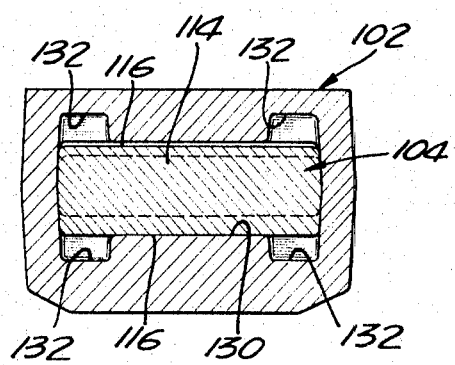
FIGURE 17 is a section taken on line 17—17 in FIGURE 14.
Figure 18:
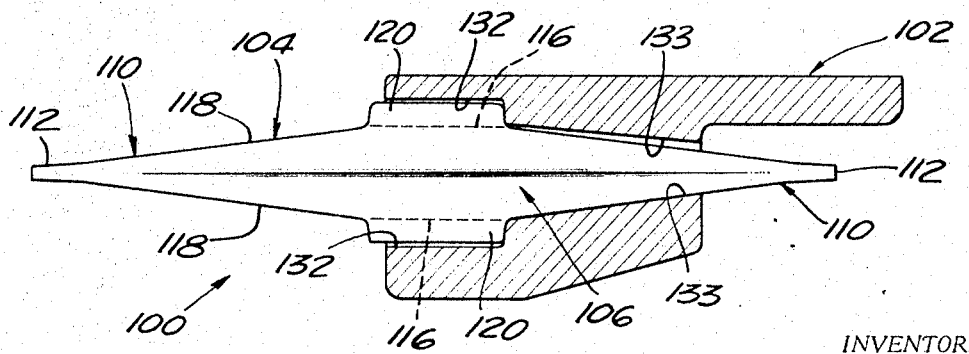
FIGURE 18 is a section taken on line 18—18 in FIGURE 16.

Still another tooth form is shown in FIGURES 10 and 11. Again the tooth end 75 and its digging element 79 are identical to the tooth end 45 and digging element 49 of FIGURE 1. However, tooth end 74 is of a generally similar configuration to the tooth end 44, but has a stub end surface into which a pair of digging elements 78a, 78b are recessed. Digging elements 78a and 78b have laterally extending knife edges and together constitute a very sharp digging blade having nearly the same breadth as the flat blade of digging element 48. However, digging elements 78a, 78b are preferably formed of tungsten carbide, in order to increase their capability for cutting hard material.

Reference is now made to FIGURES 12 through 23 of the drawings illustrating modified excavating tooth assemblies 100 and 200 according to the invention. Tooth assembly 100 is quite similar to the earlier tooth assembly 10 and includes a holder 102 and an excavating tooth 104 proper. Tooth assembly 100 differs from the earlier tooth assembly 10 in two respects, to wit, in the shape of the excavating tooth 104 and the tooth holder socket 106, and in the fastening means 108 for retaining the tooth in the holder 102. Thus, the excavating tooth 104 is symmetrical about a transverse medial plane and has essentially identical tapered working ends 110 terminating in digging elements or edges 112. Unlike the earlier excavating tooth 30, the central portion 114 of the tooth 104 has approximately the same breadth as the adjacent extremities of the tapered tooth ends 110, and the lateral surfaces 116 of the central tooth portion merge smoothly with the surfaces 118 of the tapered ends. Along opposite longitudinal edges of the central tooth portion 114 are integrally formed upstanding ribs 120. Extending through the central tooth portion is a hole 122 containing a resilient locking insert 124. This locking insert constitutes the fastening means 108. Hole 122 has tapered ends, as shown, and the insert 124 is dimensioned to be compressed radially when inserted into the hole, whereby the insert is firmly retained in the hole. The ends of the insert project longitudinally a distance beyond the lateral tooth surfaces 116.

The tooth socket 106 in the holder 102 has a front, forwardly opening rectangular portion 126 and a rear, rearwardly opening tapered portion 128. The front socket 126 provides lateral holding surfaces 130 which confront and contact the lateral tooth surfaces 116 when the excavating tooth 104 is installed in the socket. Extending into these holding surfaces are grooves 132 which complement and slidably receive the ribs 120 on the tooth. The rear socket portion 128 is tapered approximately the same angle as the tapered tooth ends 110 to provide this socket portion with lateral surfaces 133 which confront and contact the surfaces 118 of the socketed end of the tooth during excavation.

It is now evident that the excavating tooth 104 may be inserted, either end first, into the holder socket 106 to locate either working end 110 of the tooth in exposed working position. When the tooth is thus installed, the resilient insert 126 engages and is compressed axially between the socket holding surfaces 130 to retain the tooth in position in the tooth holder 102. The tooth ribs 120 engage in the socket grooves 132 and abut the rear end walls of the grooves to limit rearward axial movement of the tooth into the socket. The currently rear working end 110 of the tooth projects through the rear open end of the tooth socket 106 to permit driving of the tooth forwardly from the socket, as before. When replacing the tooth after removal, it may be rotated 180° about its longitudinal axis, in the same manner as the excavating tooth in the earlier embodiment of the invention, to equalize tooth wear, as depicted in FIGURES 20 and 21.

The modified excavating tooth assembly 200 of FIGURES 22 and 23 is identical to the tooth assembly 100 except that the tooth fastening insert 124 in the latter tooth assembly is replaced, in the tooth assembly 200, by a bolt 124a threaded in the tooth holder.

A primary feature of the invention resides in the fact that in each disclosed inventive embodiment, the working ends of the excavating tooth have an optimum longitudinally tapered shape which offers the advantages of equalizing or substantially equalizing the bending stress in the tooth occasioned by lateral excavating loads on the tooth, minimizing the material within the tooth and thereby the cost of the tooth, and reducing the cross section of the tooth adjacent its ground engaging ends or tips so as to provide the tooth with an ideal excavating or digging shape. Moreover, these tooth advantages are achieved while maintaining effective transfer of excavating loads from the tooth to the tooth holder. Thus, lateral excavating loads on the exposed working end of the excavating tooth are resisted by the rear contacting tapered surfaces of the tooth and holder socket to achieve effective transfer of such loads to the tooth holder and resist lateral rocking motion of the tooth relative to the holder under the action of the loads. Further, longitudinal excavating loads on the tooth are resisted by the contacting longitudinally presented thrust surfaces on the tooth and holder to prevent wedging of the rear tapered end of the tooth in the rear tapered portion of the tooth socket. Thus, in the form of the invention illustrated in FIGURES 1 through 5, the thrust shoulders for this purpose are the shoulders 42, 43 on the excavating tooth 30 and the shoulders 24 on the tooth holder 20. In the preferred embodiments of the invention illustrated in FIGURES 12 through 23, on the other hand, the thrust shoulders for resisting the axial loads on the excavating tooth are furnished by the rear ends of the upstanding tooth ribs 120 and the rear walls of the rib receiving grooves 132 in the tooth holder. Thus, referring to FIGURE 18, it will be observed that when the excavating tooth is inserted into the holder, the rear ends of the ribs abut the rear walls of the grooves to limit rearward movement of the tooth into the tooth socket. While the excavating tooth assembly of FIGURES 1 through 5 is quite satisfactory, the modified excavating tooth assemblies illustrated in FIGURES 12 through 23 are preferred for the reason that engagement of the tooth socket holding surfaces 130 with the confronting lateral tooth surfaces 116 provide more secure lateral support for the tooth, and are thus more effective in preventing lateral rocking movement of the tooth relative to the holder, than are the holding surfaces 26 which engage the laterally enlarged central portion of the excavating tooth in the tooth assembly of FIGURES 1 through 5. It will be observed that the holder of each disclosed excavating tooth assembly has a mounting base for attachment to a supporting surface. Projecting from one side of this base is a boss which contains a tooth receiving socket. The longitudinal dimension of this boss is such that the rear end of the socket opens through the rear end of the boss to expose the socketed end of the tooth for ease of driving the latter from the socket.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

Having described the invention, what is claimed as new in support of Letters Patent is:

1. An excavating tooth assembly comprising:
   a tooth holder containing a forwardly opening tooth receiving socket having front and rear ends, a central longitudinal axis, and a medial plane containing said axis;
   said socket being bounded along two opposite longitudinal sides by first side walls generally perpendicular to said plane and along the two remaining longitudinal sides by second side walls perpendicular to said first side walls;
   said second socket side walls having rearward tapered portions which converge toward said medial plane in the rearward direction of said socket and forward parallel portions which extend forwardly from the front ends of said rearward tapered wall portions to the front end of said socket in parallel relation to said medial plane, whereby said socket has a rear tapered extremity and a front rectangular extremity, and the spacing between said parallel wall portions being at least equal to the spacing between the front ends of said rearward tapered wall portions;
   a double ended excavating tooth having opposite tapered working end portions and an intervening generally rectangular mid portion;
   said tooth having a longitudinal axis and a medial plane containing said tooth axis, and said tooth being longitudinally insertable either end first into said socket through the open front end thereof to a position wherein said medial planes approximately coincide, said tooth mid portion being contained within said forward socket portion, one tooth end portion being contained within said rear socket portion, and the other tooth end portion extending forwardly of said holder so as to be exposed for use;
   said tooth mid portion having a rectangular shape generally complementing said forward socket portion and each tooth end portion being tapered to generally complement said rear socket portion, whereby said socket portions and their contained tooth portions have confronting surfaces which engage to transfer lateral excavating loads on said tooth to said holder and prevent rocking of said tooth relative to said holder;

said holder having internal forwardly presented thrust shoulders, and said tooth having longitudinally presented thrust shoulders engageable with said holder thrust shoulders to limit longitudinal insertion of said tooth into said socket through said front end thereof and to transfer longitudinal excavating loads on said tooth to said holder;

said thrust shoulders being disposed to limit insertion of said tooth into said holder to a position wherein the inserted tapered tooth end portion fits snugly but without a wedging fit within said rear tapered socket portion, whereby said thrust shoulders prevent tight frictional wedging of said tooth within said socket under the action of longitudinal excavating loads on said tooth and thereby permit easy removal of said tooth from said holder;

said tooth being longitudinally removable from said socket through the front end thereof to permit the position of said tooth in said holder to be reversed; and means releasably securing said tooth in said holder.

2. An excavating tooth assembly according to claim 1 wherein:

said spacing between said parallel socket wall portions is greater than said spacing between the front ends of said tapered socket wall portions, whereby said front socket portion is enlarged laterally of said medial socket plane relative to the front end of said rear socket portion to define said socket thrust shoulders at the juncture of said socket portions; and said tooth mid portion is enlarged laterally of said longitudinal medial tooth plane relative to the adjacent extremities of said tooth end portions to define said tooth thrust shoulders at the junctures of said tooth mid portion and end portions.

3. An excavating tooth assembly according to claim 1 wherein:

said spacing between said parallel socket wall portions is substantially equal to said spacing between the front ends of said tapered socket wall portions, whereby said front socket portion has a width laterally of said medial socket plane approximating the corresponding width of the front extremity of said rear socket portion;

said tooth mid portion has a width laterally of said medial tooth plane approximating the corresponding width of the adjacent extremities of said tooth end portions;

said tooth includes upstanding longitudinal ribs on said tooth mid portion;

said front socket portion has grooves receiving and complementing said ribs; and said ribs have end surfaces and said grooves have rear end walls which provide, respectively, said tooth and socket thrust surfaces.

4. An excavating tooth assembly according to claim 1 wherein said securing means comprise a dimple in one surface of said tooth mid portion, and a removable fastener carried by said holder and engaging in said dimple.

5. An excavating tooth assembly according to claim 1 wherein said tooth mid portion has an opening extending therethrough, and said securing means comprises a resilient insert fixed within and protruding slightly beyond the ends of said tooth opening for frictional contact with the confronting socket wall surfaces in such a way that said insert is compressed axially between said socket wall surfaces to frictionally retain said tooth in said holder.

6. An excavating tooth assembly according to claim 1 wherein:

said tooth mid portion has an opening extending therethrough, and said securing means comprises a removable fastener carried by said holder and extending through said tooth opening.

References Cited

UNITED STATES PATENTS

| | | | |
|---|---|---|---|
| 457,047 | 8/1891 | Green | 37—142 |
| 1,082,802 | 12/1913 | Full | 37—142 |
| 1,461,136 | 7/1923 | Moore | 37—142 |
| 1,685,196 | 9/1928 | Gilbert | 37—142 |
| 1,959,847 | 5/1934 | Van Buskirk | 37—142 XR |
| 1,980,897 | 11/1934 | Winings | 37—142 XR |
| 2,319,464 | 5/1943 | Massa | 37—142 |
| 2,401,250 | 5/1946 | Kandle | 37—142 XR |
| 2,472,892 | 6/1949 | George | 37—142 |
| 2,549,088 | 4/1951 | Hettelsater et al. | 37—142 XR |
| 2,780,014 | 2/1957 | Arps | 37—142 XR |
| 3,197,894 | 8/1965 | Ratkowski | 37—142 |
| 3,286,378 | 11/1966 | Benetti | 37—142 |

EDGAR S. BURR, *Primary Examiner.*

U.S. Cl. X.R.

172—735; 175—383; 299—91